US006966694B2

(12) United States Patent
Kihira et al.

(10) Patent No.: US 6,966,694 B2
(45) Date of Patent: Nov. 22, 2005

(54) ELECTRONIC CLINICAL THERMOMETER

(75) Inventors: Masazumi Kihira, Age-gun (JP); Hiroshi Ogawa, Matsuzaka (JP); Hirokazu Kitagawa, Matsuzaka (JP); Susumu Minamikawa, Kyoto (JP)

(73) Assignee: OMRON Healthcare Co., Ltd., Tokyo (JP)

( * ) Notice: Subject to any disclaimer, the term of this patent is extended or adjusted under 35 U.S.C. 154(b) by 0 days.

(21) Appl. No.: 10/449,981

(22) Filed: May 30, 2003

(65) Prior Publication Data

US 2003/0231696 A1    Dec. 18, 2003

(30) Foreign Application Priority Data

Jun. 13, 2002 (JP) ............................. 2002-172177

(51) Int. Cl.$^7$ ............................. G01K 1/00; G01K 7/00; G01K 9/00; G08B 3/00
(52) U.S. Cl. ..................... 374/208; 374/163; 600/549
(58) Field of Search ................... 374/163, 208, 374/100; 340/384.6, 384.1, 388.1, 388.4, 340/391.1; 600/474, 549; 331/64, 66

(56) References Cited

U.S. PATENT DOCUMENTS

| | | | | |
|---|---|---|---|---|
| 4,157,459 A | * | 6/1979 | Bush et al. | 340/384.6 |
| 4,282,520 A | * | 8/1981 | Shipp et al. | 340/629 |
| 4,471,258 A | * | 9/1984 | Kumada | 310/345 |
| 4,579,464 A | * | 4/1986 | Yamazaki et al. | 374/163 |
| 4,602,245 A | * | 7/1986 | Yang et al. | 340/384.6 |
| 4,701,749 A | * | 10/1987 | Barnes | 340/384.6 |
| 5,165,798 A | * | 11/1992 | Watanabe | 374/208 |
| 6,307,300 B1 | | 10/2001 | Yamamoto et al. | |
| 6,394,648 B1 | * | 5/2002 | Tseng | 374/208 |

FOREIGN PATENT DOCUMENTS

| | | | | | |
|---|---|---|---|---|---|
| DE | 3013788 A | * | 10/1981 | | G10K 9/12 |
| EP | 1032244 | | 8/2000 | | |
| JP | 58034381 A | * | 2/1983 | | G04C 21/02 |
| JP | 61062831 A | * | 3/1986 | | |
| JP | 01018031 A | * | 1/1989 | | G01K 7/00 |
| JP | 04267296 A | * | 9/1992 | | G10K 9/12 |
| JP | 04275594 A | * | 10/1992 | | G10K 9/12 |
| JP | 07181977 A | * | 7/1995 | | G10K 9/122 |
| JP | 07191679 A | * | 7/1995 | | G10K 9/122 |
| JP | 11248546 A | * | 9/1999 | | G01K 7/00 |

* cited by examiner

*Primary Examiner*—Gail Verbitsky
*Assistant Examiner*—Mirellys Jagan
(74) *Attorney, Agent, or Firm*—Beyer Weaver & Thomas LLP

(57) ABSTRACT

An electronic thermometer contains inside its main body not only a temperature detecting device and a display device for displaying the measured body temperature but also a buzzer for outputting a warning sound. The buzzer is formed with a piezoelectric plate on an oscillating plate, having an elongated shape and being securely supported only at mutually opposite end parts in its longitudinal direction, and these end parts remain fixed in the primary mode of oscillation. A resonance chamber is formed between the buzzer and its support structure. A buzzer cover, which serves to secure the buzzer by contacting it only at its end parts, also contacts the main body in a direction opposite from the support structure so as to propagate the buzzer oscillations to the main body.

14 Claims, 5 Drawing Sheets

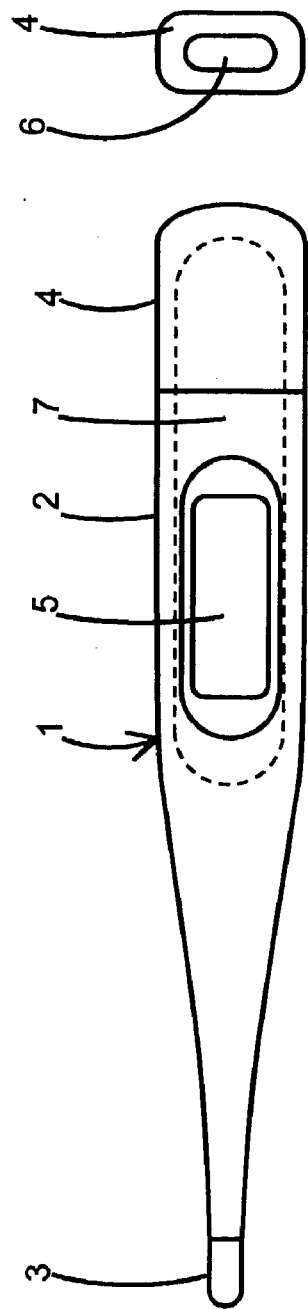
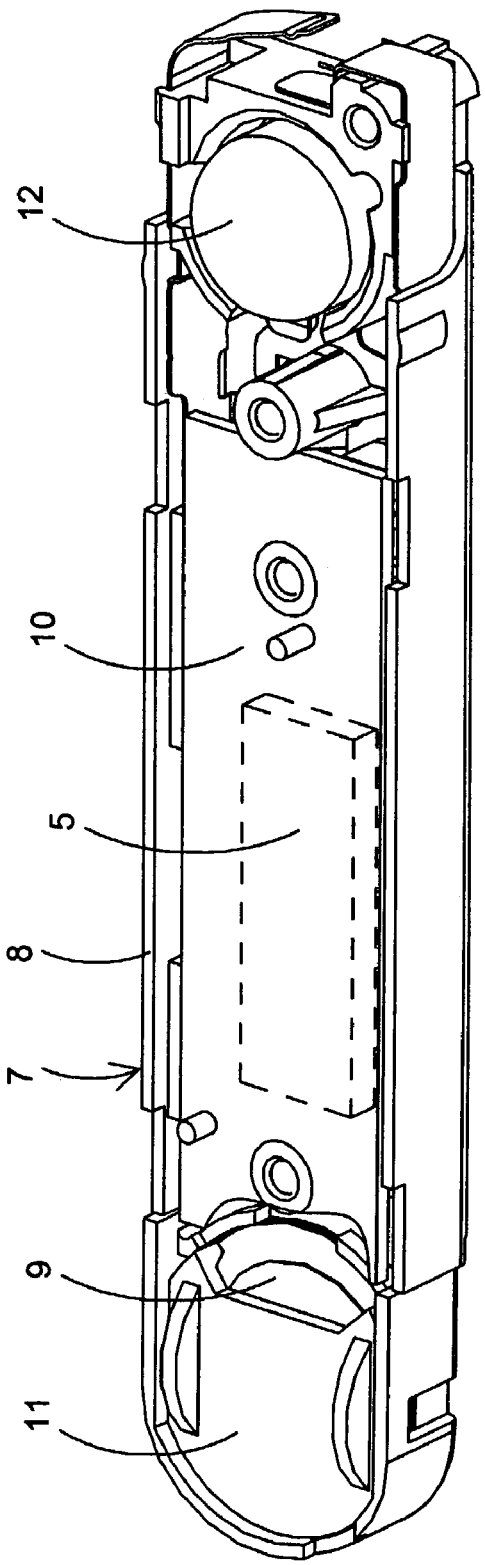

ELECTRONIC CLINICAL THERMOMETER

BACKGROUND OF THE INVENTION

This invention relates to an electronic thermometer for measuring body temperature, and more particularly to such a thermometer capable of outputting a warning sound with improved quality.

Since a clinical thermometer is inserted in the armpit or under the tongue to measure the body temperature, it is difficult to visually ascertain its current condition such as whether the measurement is still being taken or the measurement has been completed. For this reason, it has been known to incorporate a buzzer or the like in a clinical thermometer for acoustically outputting the condition of an electronic thermometer. In order to improve the dependability of the output, the sound wave pressure must be increased either by using a larger buzzer or applying an increased voltage to the buzzer.

In view of the manner in which clinical thermometers are used, however, their outer dimensions cannot be increased indefinitely. There is a limit beyond which the buzzer to be incorporated in a thermometer or its circuit element cannot be made larger. Thus, Japanese Patent Publication Tokko 4-30512 disclosed a circular buzzer contacting a rib inside the main housing of a thermometer so as to use the interior of the housing as a resonance chamber, Japanese Patent Publication Tokko 4-77257 disclosed a buzzer placed in an indentation prepared by making a portion of the housing structure thinner for providing a resonance space similarly as described above and making the characteristic frequency of this thinned portion of the housing equal to that of the buzzer, and Japanese Patent Publication Tokkai 61-62831 and Japanese Patent 2539224 disclosed a structure having sound-conducting routes and openings connecting the inner space and the exterior of the main housing.

One thing that is common to all these technologies is that the internal surfaces of a box-like structure is used for amplifying the sound pressure inside the resonance space and hence the construction of the box-like structure becomes complicated and/or the production process becomes cumbersome because the buzzer must be adhesively attached to the box-like structure.

Aforementioned Japanese Patent 2539224 also discloses an example whereby a resonance chamber is provided inside a buzzer unit which is separate from a box-like structure but since it is a separate unit from the module frame on which a printed circuit board (PCB) is affixed, the number of constituent parts to be assembled and hence also the number of steps in the production process are increased. Moreover, lead lines longer than the distance of separation will be required to connect the buzzer with the PCB. This will give rise to the problem of requiring a larger housing structure to contain these long lead lines as well as the problem of increased probability of breakage in the lead lines as they are bent.

If the main housing is formed with sound-conducting routes and openings, on the other hand, the inner cavity and the resonance chamber come to directly communicate to the exterior and the thermometer cannot be completely waterproofed. If one must take into consideration the possibility of the internal resonance chamber becoming invaded with water, the buzzer and the resonance chamber may have to be connected in an airtight manner in order to protect the electrical circuits. For this purpose, the entire peripheral edge of the buzzer will have to be adhesively attached to the resonance chamber, and this will allow the oscillating plate of the buzzer to vibrate only under this fixed boundary condition. As a result, only the center point becomes the point of maximum amplitude in the primary mode of oscillation, and this brings about the problem of low efficiency in the conversion to sound energy.

SUMMARY OF THE INVENTION

It is therefore an object of this invention in view of these problems of prior art technologies to provide an electronic clinical thermometer with improved output capability of warning sound without placing limitations on the manner of use and waterproofing.

An electronic thermometer embodying this invention, with which the above and other objects can be accomplished, may be characterized as comprising not only a main body including a temperature detecting part and means for detecting and displaying temperature of the temperature detecting part, as do prior art thermometers, but also a buzzer that is elongated in a longitudinal direction, having a pair of mutually opposite end parts in the longitudinal direction and a support structure contained inside the main body such that the end parts of the buzzer are securely supported by this support structure. With the buzzer thus shaped, an oscillating plate with a relatively large area can be used for the buzzer without increasing the size of the space for containing it. When the buzzer oscillates in its primary characteristic mode with only its end parts securely supported, the points of maximum amplitude of oscillation lie on a line which is at an equal distance from these end parts. As a result, the maximum amplitude of oscillation and the area of maximum amplitude of oscillation become much larger than if the entire peripheral edge portions are fastened according to the prior art technology. In other words, a far greater sound conversion efficiency can be attained according to this invention.

The support structure may be formed so as to have a support member for contacting the end parts of the buzzer from below. It is also preferable to form the support structure so as to contain therein a control circuit inclusive of a driving circuit for the buzzer. In this manner, the buzzer can be connected to its driving circuit with relatively shorter lead lines and the problems of making the thermometer bulky as a whole and causing the connecting lead lines to be damaged by bending them within a small space can be eliminated.

It is further preferable to provide the support structure with a sound chamber, or a resonance chamber. Its bottom surface, opposite to the buzzer, may be provided with a sound-conducting opening. In this manner, the structure of the main body becomes simpler than if a resonance space were to be provided inside the housing structure according to the prior art technology.

The electronic thermometer may further comprise a buzzer-securing member for securing the buzzer, having contact parts that contact the buzzer only at its end parts from above, that is, in a direction opposite from the support member of the support structure. With such a member provided, there is no need to use any adhesive to secure the buzzer relative to the sound chamber or to a circuit board and hence the assembly work becomes easier. If the buzzer-securing member is in the form of a cover over the buzzer and is made to contact also the main body, the buzzer oscillations can propagate therethrough to the main body and hence the sound emission of the buzzer can be improved.

BRIEF DESCRIPTION OF THE DRAWINGS

FIGS. 1A and 1B, together referred to as FIG. 1, are respectively a plan view and a right-hand side view of an electronic thermometer embodying this invention.

FIG. 2 is a diagonal view of the inner unit of thermometer of FIG. 1 for showing its internal structure.

DETAILED DESCRIPTION OF THE INVENTION

Figure 3A:
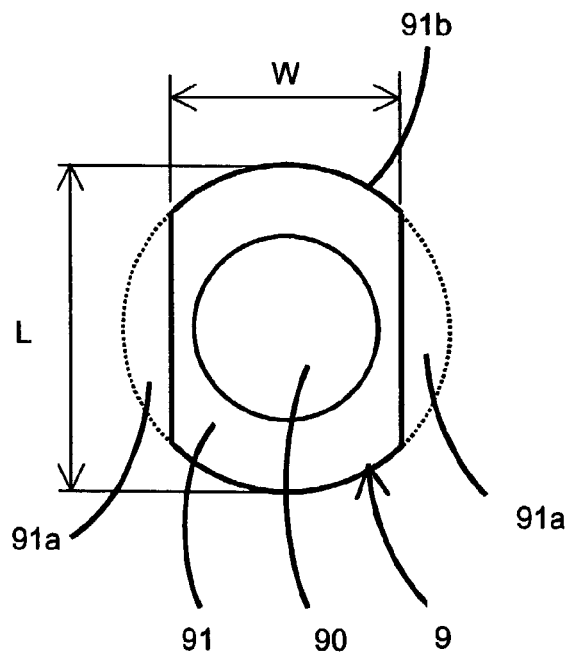
FIG. 3A is a plan view of the buzzer shown in FIG. 2.

The invention is described next by way of an example. FIG. 1 shows an electronic thermometer 1 embodying this invention, comprising a main body 2 which is elongated and has a front tip forming a temperature detecting part 3, a battery cover 4 which is detachably attached to the back end part of the main body 2, a display device (LCD) 5 for displaying the result of measurement, a push button 6 provided on the back surface of the main body 2 for starting the operation of the thermometer, and an inner unit 7 disposed inside the main body 2. As shown in FIG. 2, the inner unit 7 is formed with a sub-case 8 having attached thereon a buzzer 9, a control circuit (with a PCB 10), a buzzer cover 11, the display device 5, a battery 12, lead lines and terminals (not shown) for connecting these components electrically, and a thermocouple (not shown) serving as the aforementioned temperature detecting part 3.

As the push button 6 is pressed, the control circuit carries out an initialization process. When the thermometer 1 is ready to take a measurement, an output to this effect is made through the display device 5 and the buzzer 9. As the temperature detecting part 3 is held in the armpit of a patient or inserted under the tongue, the control circuit starts a temperature-measuring process and calculates a temperature value from the temperature detected by the temperature detecting part 3. When the measurement process is completed, the end of the process is communicated by the buzzer 9, and the calculated temperature value is displayed on the display device 5.

Figure 3B:
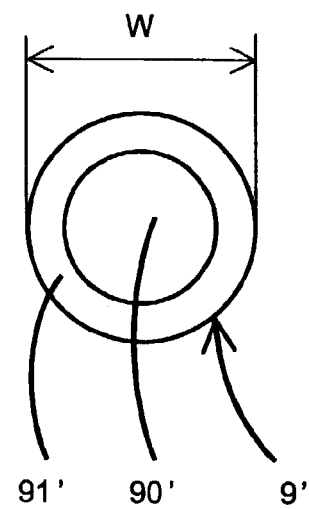
FIG. 3B is a plan view of a prior art buzzer.

As shown in FIG. 3A, the buzzer 9 is formed mainly with a piezoelectric plate 90 and an oscillating plate 91, the piezoelectric plate 90 being set above the oscillating plate 91. The piezoelectric plate 90 is circular in shape, but the oscillating plate 91 is of a shape which may be described as a circle (with diameter L) from which mutually opposite arch-shaped portions 91a are removed (or as a rectangle with a pair of mutually opposite edges of length W replaced by outwardly protruding arcs 91b of diameter L). This is to be compared with a traditional buzzer 9' with a circular piezoelectric plate 90' and a circular oscillating plate 91', as shown in FIG. 3B. The space for containing the buzzer 9 inside the sub-case 8 is limited, as shown at 80 in FIG. 5. If its width is W, the diameter of the oscillating plate 91' could not be larger than W. According to this invention, by contrast, the separation between the two arch-shaped portions 91a must be reduced to W but its longitudinal dimension is not affected by the width of the space 80. In other words, a buzzer larger than a circle of diameter W can be used according to this invention and the volume of the sound from the buzzer increases accordingly.

Figure 4:
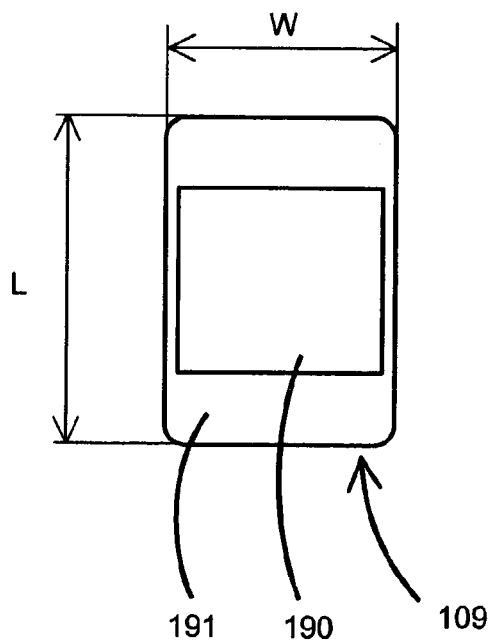
FIG. 4 is a plan view of another buzzer that may be used in a thermometer embodying this invention.

The shape of the buzzer as shown in FIG. 3A is not intended to limit the scope of the invention. FIG. 4 shows another buzzer 109 with rectangular piezoelectric and oscillating plates 190 and 191.

Figure 5:
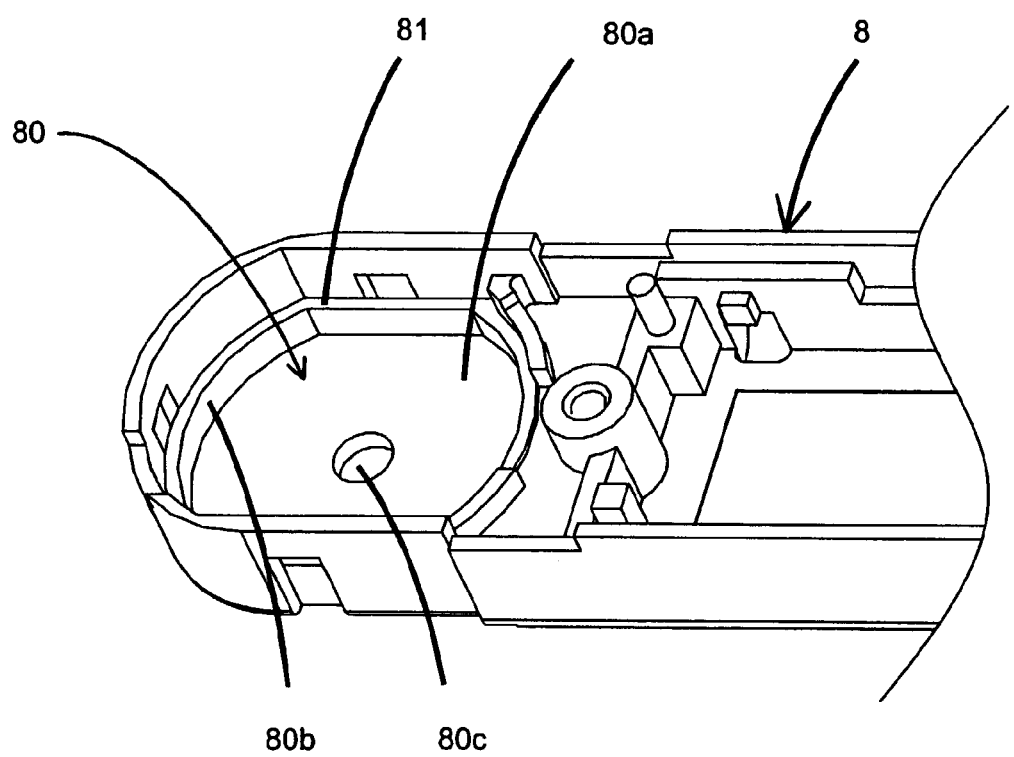
FIG. 5 is an enlarged diagonal view of a portion of the thermometer of FIG. 1 where the buzzer is set.
Figure 6A:
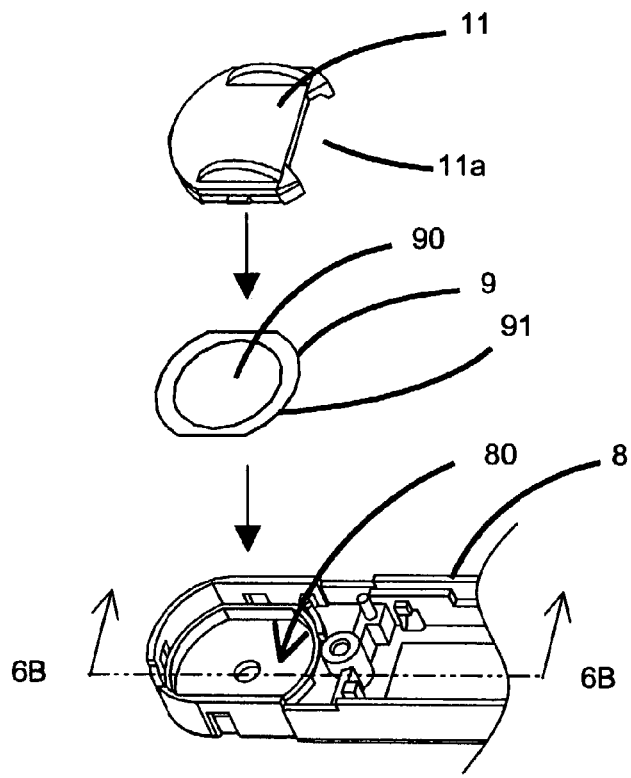
FIGS. 6A and 6B, together referred to as FIG. 6, are respectively an exploded diagonal view of a portion of the sub-case, the buzzer and the buzzer to show their positional relationship and a sectional view taken along line 6B—6B of FIG. 6A.
Figure 6B:
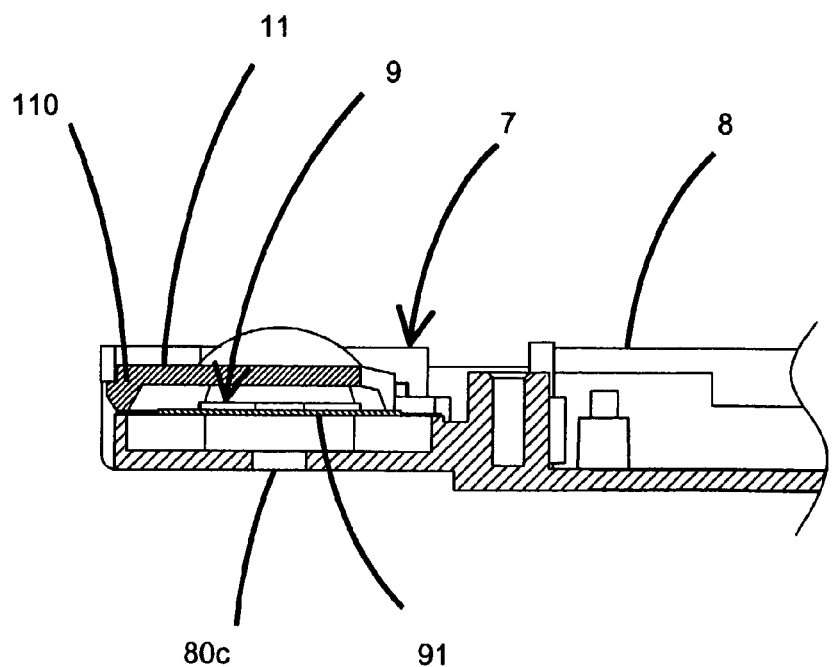

FIGS. 5 and 6 show how the buzzer 9 is assembled to the inner unit 7. The buzzer 9 is placed on a support member 81 around the buzzer-containing space 80 of the subcase 8. A sound-conducting opening 80c is provided in the bottom surface 80a of this space 80. As the buzzer 9 is placed on the support member 81, an empty space is formed surrounded by the bottom surface 80a, a cylindrical side surface 80b and the buzzer 9, serving as a resonance chamber when the buzzer 9 is sounded, so as to increase the sound pressure of the buzzer 9. In this example, the buzzer-containing space 80 itself serves as a sound box.

The buzzer cover 11, serving as means for holding the buzzer 9 securely, is disposed above the buzzer 9 placed in the buzzer-containing space 80 of the sub-case 8. The support member 81 is formed so as to support the entire peripheral edge portions of the oscillating plate 91, as shown in FIG. 5. The buzzer cover 11, on the other hand, is formed such that its rim part 110 contacts only the arcuate portions 91b (shown in FIG. 3A). Thus, when the buzzer 9 is activated, the oscillating plate 91 oscillates under this boundary condition with only the mutually opposite end edges in its longitudinal direction secured.

Thus, the points of maximum amplitude of oscillation, when the buzzer oscillates in its primary characteristic mode, lie on a line which is at an equal distance from the innermost positions of the side surfaces fastened by the contact with the buzzer cover 11. As a result, the area of maximum amplitude of oscillation becomes much larger than if the entire peripheral edge portions are fastened according to the prior art technology. In other words, a far greater sound conversion efficiency can be attained according to this invention.

Although the invention has been described above by way of only one example, this example is not intended to limit the scope of the invention. Many modifications and variations are possible within the scope of the invention. Although an example was shown above wherein the oscillating plate 91 of the buzzer 9 is fastened at both end positions by designing the shape of the buzzer cover 11 accordingly, the support member 81 around the buzzer-containing space 80 may be designed in a shape so as to contact only the arcuate portions 91b of the oscillating plate 91. As still another example, both the buzzer cover 11 and the support member 81 may be designed such that they both contact the oscillating plate 91 only along the arcuate edge portions 91b.

As shown in FIG. 6A, buzzer cover 11 may have an opening 11a formed at one extreme edge position in its longitudinal direction for passing lead line therethrough for electrically connecting the buzzer 9 with the PCB 10. In other words, as shown by this example, it is not necessary for obtaining the effect of this invention that the buzzer should be secured along its extreme edges as long as the rim part 110 secures the oscillating plate 91 so as to allow it to undergo oscillations in a mode of oscillation under the condition of being supported at both its mutually opposite end parts.

Figure 7:
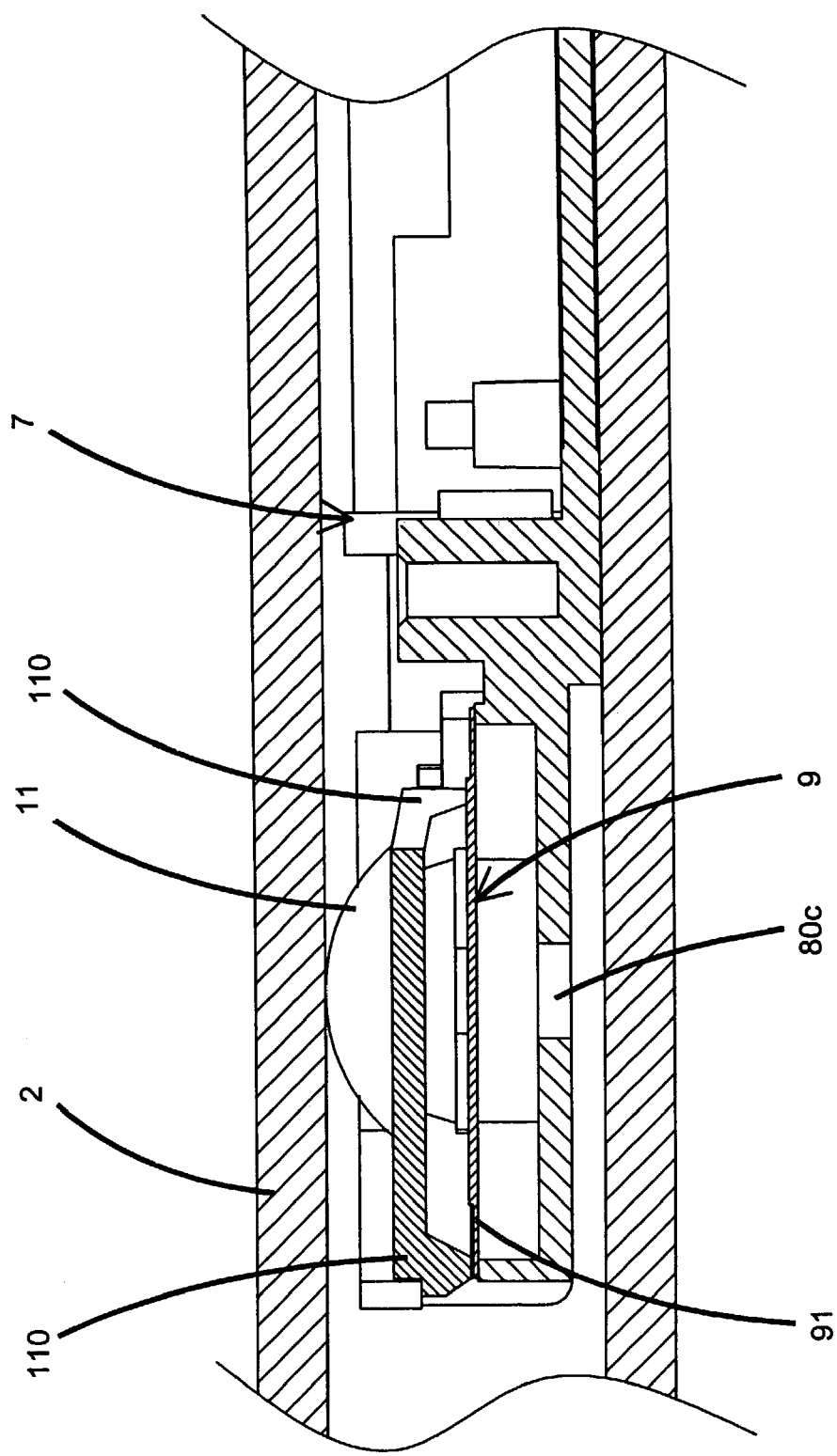
FIG. 7 is an enlarged sectional view of a portion of the thermometer of FIG. 1 in the neighborhood of the buzzer.

FIG. 7 shows the inner unit 7 inserted inside the main body 2. In this situation, the buzzer cover 11 is in contact with the inner surface of the main body 2. This serves not only to further increase the sound pressure inside the resonance chamber formed by the buzzer-containing space 80 but also to improve the transmission of sound by causing the vibrations of the buzzer 9 to propagate through the main body 2 and through the buzzer cover 11.

In summary, the sound effect of the buzzer can be improved according to this invention without adversely affecting the manner of using the thermometer, the ease of assembly or the water-proof characteristic.

What is claimed is:

1. An electronic thermometer comprising:
    a main body including a temperature detecting part;
    means for detecting and displaying temperature of said temperature detecting part;
    a buzzer that is elongated in a longitudinal direction, having a pair of mutually opposite end parts in said longitudinal direction;
    a support structure contained inside said main body, said support structure securely supporting said buzzer only at said end parts of said buzzer; and
    a buzzer-securing member for securing said buzzer, said buzzer-securing member having contact parts that contact said buzzer only at said end parts in a direction opposite said support structure.

2. The electronic thermometer of claim 1 wherein said buzzer-securing member contacts also said main body.

3. The electronic thermometer of claim 1 wherein said end parts of said buzzer are arcuately shaped.

4. The electronic thermometer of claim 3 wherein said buzzer-securing member contacts also said main body.

5. The electronic thermometer of claim 1 wherein said support structure contains a control circuit including a driving circuit for said buzzer.

6. The electronic thermometer of claim 5 wherein said buzzer-securing member contacts also said main body.

7. The electronic thermometer of claim 1 wherein said support structure has support members which contact said buzzer only at said end parts.

8. The electronic thermometer of claim 7 wherein said buzzer-securing member contacts also said main body.

9. The electronic thermometer of claim 7 wherein said support structure has a sound chamber with side surfaces and a bottom surface, said bottom surface being opposite said buzzer and having a sound-conducting opening, said support members being along said side surfaces.

10. The electronic thermometer of claim 9 wherein said buzzer-securing member contacts also said main body.

11. An electronic thermometer comprising:
    a main body including a temperature detecting part;
    means for detecting and displaying temperature of said temperature detecting part;
    a buzzer that is elongated in a longitudinal direction, having a pair of mutually opposite end parts in said longitudinal direction;
    a support structure contained inside said main body, said support structure having support members which contact said buzzer from below only at said end parts and securely supporting said buzzer only at said end parts of said buzzer; and
    a buzzer-securing member for securing said buzzer from above, said buzzer-securing member having contact parts that contact said buzzer only at said end parts in a direction opposite said support structure.

12. The electronic thermometer of claim 11 wherein said buzzer-securing member contacts also said main body and serves to cause vibrations of said buzzer to propagate therethrough and through said main body.

13. The electronic thermometer of claim 11 wherein said end parts of said buzzer are arcuately shaped and said support structure has a sound chamber with side surfaces and a bottom surface, said bottom surface being opposite said buzzer and having a sound-conducting opening, said support members being along said side surfaces.

14. The electronic thermometer of claim 13 wherein said buzzer-securing member contacts also said main body above said buzzer and serves to cause vibrations of said buzzer to propagate therethrough and through said main body and to increase sound pressure inside said sound chamber.

* * * * *